US012562455B2

(12) United States Patent
Thakur et al.

(10) Patent No.: US 12,562,455 B2
(45) Date of Patent: Feb. 24, 2026

(54) COMMUNICATION DEVICE, ANTENNA MODULE AND NON-TRANSITORY COMPUTER READABLE MEDIUM

(71) Applicant: Intel Corporation, Santa Clara, CA (US)

(72) Inventors: Jayprakash Thakur, Bangalore (IN); Prakash Kurma Raju, Bangalore (IN); Smit Kapila, Bangalore (IN); Mousumi Deka, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 18/054,543

(22) Filed: Nov. 11, 2022

(65) Prior Publication Data

US 2023/0187816 A1 Jun. 15, 2023

(30) Foreign Application Priority Data

Dec. 14, 2021 (EP) .................................... 21214353

(51) Int. Cl.
*H01Q 1/22* (2006.01)
*G06F 1/186* (2026.01)
*H01Q 1/24* (2006.01)

(52) U.S. Cl.
CPC .................................. *H01Q 1/241* (2013.01)

(58) Field of Classification Search
CPC .......... H01Q 1/24; H01Q 1/241; H01Q 1/243; H01Q 1/22; H01Q 1/2266; H01Q 1/2275; G06F 1/1698; G06F 1/186
See application file for complete search history.

(56) References Cited

U.S. PATENT DOCUMENTS

| | | | | |
|---|---|---|---|---|
| 6,172,645 B1 * | 1/2001 | Hollander | H01Q 1/2275 | 343/702 |
| 8,519,904 B2 * | 8/2013 | Hsu | H01Q 1/2258 | 345/169 |
| 2008/0074329 A1 * | 3/2008 | Caballero | H01Q 1/088 | 343/702 |

(Continued)

FOREIGN PATENT DOCUMENTS

| | | |
|---|---|---|
| CN | 112558695 A | 3/2021 |
| EP | 0936694 A2 | 8/1999 |

OTHER PUBLICATIONS

European Search Report issued for the corresponding patent application No. EP 21 21 4353, dated Jun. 10, 2022, 12 pages (for informational purposes only).

*Primary Examiner* — Thai Pham
(74) *Attorney, Agent, or Firm* — Viering, Jentschura & Partner mbB

(57) ABSTRACT

A communication device including a chassis; and a wireless communication interface having an antenna and a mounting structure, the mounting structure mounting the antenna to the chassis, wherein the mounting structure is configured to arrange the antenna in a first position and in at least a second position, wherein in the first position the antenna is arranged in a first distance to a surface of the chassis, and in the second position the antenna is arranged in a second distance to the surface of the chassis, wherein the second distance is larger than the first distance, wherein the antenna is operational in the same frequency range in each of the first position and the second position.

19 Claims, 14 Drawing Sheets

(56) References Cited

U.S. PATENT DOCUMENTS

| | | | | |
|---|---|---|---|---|
| 2009/0009421 | A1 | 1/2009 | Suprunov | |
| 2011/0085308 | A1* | 4/2011 | Lee | G06F 1/1698<br>361/752 |
| 2018/0316082 | A1* | 11/2018 | Keller, III | H01Q 1/38 |

* cited by examiner

COMMUNICATION DEVICE, ANTENNA MODULE AND NON-TRANSITORY COMPUTER READABLE MEDIUM

CROSS-REFERENCE TO RELATED APPLICATIONS

This application claims priority to European Patent Application 21 214 353.1, filed on Dec. 14, 2021, the entire contents of which are hereby incorporated by reference.

TECHNICAL FIELD

This disclosure generally relates to communication devices having a wireless communication interface.

BACKGROUND

Wireless communications devices, e.g. laptops, have a limited restricted wireless communication range due to chassis design limitations, e.g. thin Z height (e.g. laptop thickness) and metallic chassis structures. Thus, the fixed internal antenna of the communication device has limited range in different modes of applications. As an example, a laptop can have a good wireless performance in laptop mode. However, the performance of the antenna can worsen in closed lid or tablet mode as the display lid overlaps with the antenna. Illustratively, the antenna performance is severely impacted in closed lid/tablet mode (360 convertible) due to chassis metal covering or the display lid coming closer to the antenna module. This may severely degrade or disconnect of a wireless communication link. Further, the wireless performance is generally lower in places with low signal strengths. Although there is a plastic keep-out-zone (KOZ) around the internal antenna, the wireless performance of the laptop mode may not be provided in tablet mode or closed lid mode in a conventional communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1A:
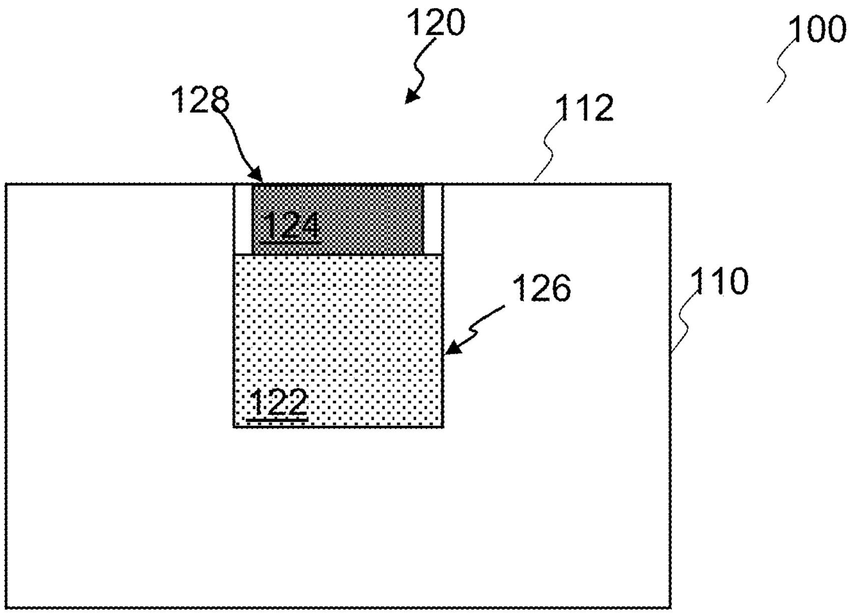
FIG. 1A and FIG. 1B illustrate schematic diagrams of a communication device.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

Illustratively, instead of having the antenna module permanently fixed inside the chassis in a conventional communication device, the antenna is arranged in a partially ejectable mechanical case (also denoted as tray, mounting structure, or mounting means) that pops out into an elevated position (horizontally or vertically) and can be pushed back into its default position in the chassis, as needed. The default position may be the position of a conventional antenna. The elevated position may be taken by an ejection process starting in the default position.

The chassis may be any kind of metal structure configured to carry a plurality of components of the communication device. The communication device may further include a housing configured to house (also denoted as enclose) the chassis and at least a part of the plurality of components of the communication device. The housing may include one or more component parts that are attached together to form the housing. The housing may include cut out portions, e.g. for plugs, sockets or keys of keypad.

In a default mode, the antenna may be arranged in a standard slot inside the chassis (also denoted as first position). This may correspond to the permanent position (also denoted as standard position or default position) of a conventional antenna design.

In a boost mode, the antenna module may partially pop outside of the chassis (also denoted as second position), e.g. by a push-push mechanism, and can have a significantly improved antenna performance regarding the antenna performance in default position. The antenna can be pushed back into the first position when needed. This way, conventional antenna designs can be used for an improved antenna performance in various usage modes of the communication device.

The antenna may be used in a wireless communication interface of a communication device, e.g. a laptop. The communication devices may include a tablet (360) mode and/or a closed lid mode. The antenna, e.g. arranged lateral to the lid, can have an improved antenna performance in the tablet mode and/or closed lid mode. Illustratively, the antenna module, in ejected/pop out mode is farther away from chassis base or lid metal which results in the improved antenna performance.

As another example, a keyboard (also denoted as keypad) of the communication device may include the antenna designed as or similar to a key of the keyboard. Alternatively, or in addition, one of the keys of the keyboard may include the antenna. As an example, there may be a first pressure threshold value necessary to push the key from a default position to input content associated with the key. The key including the antenna may further have a second pressure threshold value larger than the first pressure threshold value. Here, the first position may be the default position of the respective key. Thus, by pushing the key having the antenna (e.g. the "F4" key) with a pressure larger than the second pressure threshold value, the key may lock-in in the second position. Alternatively, or in addition to the pressure threshold value, a timed-based threshold value corresponding to the time the key including the antenna is pressed may be used. Thus, in case the key is pressed longer than a predetermined time threshold value, the antenna passes in to the boost mode position (also denoted as second position). The antenna in the second position may have an improved antenna performance as the antenna gets unobstructed reception, e.g. father away from a base metal chassis, when getting into the second position. As an example, the antenna return loss reduces from −3 dB to −8 dB at 2.45 GHz in comparison to the conventional communication device. Alternatively, the keyboard may include an additional key including the antenna, or there may be an additional key including the antenna adjacent to the keyboard.

Thus, the communication device may have the same design as a conventional communication device, e.g. input/output locations may be the same as in the conventional communication device. Further, conventional antenna designs may be used for the wireless communication interface.

Wireless performance may be improved in all the use cases of thin and light system, e.g. in tablet/closed lid mode. Further, the wireless communication performance of antennas is improved in areas with low signal strength.

Figure 1B:
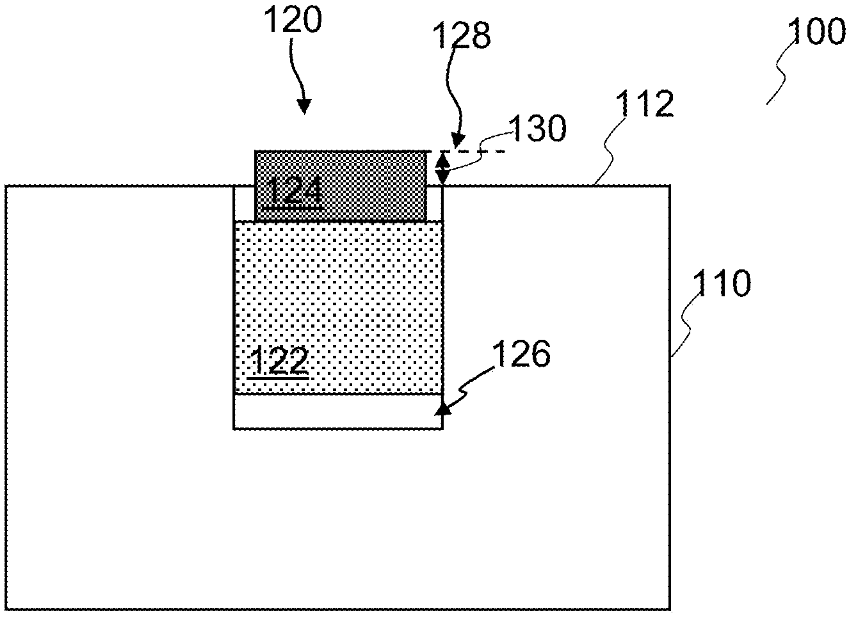

FIG. 1A and FIG. 1B schematically illustrate a mobile communication device 100. The mobile communication device 100 may include a chassis 110 and a wireless communication interface 120. FIG. 1A illustrates a first position of the communication interface 120 relative to the chassis 110, and FIG. 1B illustrates a second position of the communication interface 120 relative to the chassis 110. An unobstructed wireless communication interface 120, e.g. obstructed by the chassis 110, can enhance the field of view of coverage of the communication device and/or enhance the user experience on the device connectivity.

The communication interface 120 may include an antenna 124 and a mounting structure 122.

The mounting structure 122 may mount the antenna 124 to the chassis 110.

The mounting structure 122 may be configured to arrange the antenna 124 in a first position (as illustrated in FIG. 1A) and in at least a second position (as illustrated in FIG. 1B). In the first position the antenna 124 may be arranged in a first distance to a surface 112 of the chassis 110, and in the second position the antenna 124 may be arranged in a second distance to the surface 112 of the chassis 110. The surface 112 may be or include an edge of the chassis 110. The second distance may be larger than the first distance—in FIG. 1B illustrated by the offset 130. The first distance and the second distance may be determined based on a position of a surface 128 of the antenna 124 relative to a surface 112 of the chassis 110.

The chassis 110 may include a recess 126 in which the communication interface 120 is arranged. In the first position, the communication interface 120 may be arranged in the recess 126. As an example, in the first position, the surface 128 of the antenna 124 and the surface 112 of the chassis may be aligned in a common plane. In other words, the antenna 124 and a surface 112 of the chassis 110 may about co-planar in the first position. Thus, in the first position, the antenna 124 may provide nil or no substantial leverage for a mechanical force applied from the outside. In other words, in the first position, the antenna is protected from the outside.

In the second position, the antenna 124 extends beyond the surface 112 of the chassis 110. Thus, the mounting structure 122 exposes the antenna or at least a portion of the antenna 124 in the second position. This way, depending on the application, e.g. a closed lid/tablet mode use case, the antenna 124 in the second position may have the same or an improved radio reception as in the first position.

As an example, in case the chassis is formed of an electrically conductive material, e.g. a metal chassis, the chassis 110 may block or absorb a portion of the signals transmitted or received by the antenna 124 in the first position, but not in the second position. Thus, the antenna 124 in the second position may have a better performance than in the first position.

Illustratively, the antenna 124 in the first position and in the second position may include the same effective aperture and impedance. In other words, the antenna 124 may be of a fixed size and/or form factor independent from the position of the first position and the second position. Thus, the antenna 124 may be operational in each of the first position and the second position, and the antenna 124 may be operational in the same frequency range in each of the first position and the second position.

The second distance may be larger than the first distance in a range from about 0.5 mm to 5 mm, e.g. up to 2 mm. In other words, the offset 130 may be in a range from about 0.5 mm to 5 mm, e.g. 0.5 mm to 2 mm.

The communication device 110 may be a laptop computer including a display lid and/or a keypad having a plurality of keys coupled to the chassis 110.

As an example, the display lid and the chassis 110 may be coupled to a hinge. The wireless communication interface 120 may be arranged in the proximity of the hinge, at a side of the hinge, in the hinge or a few centimeters displaced from the hinge. This way, the wireless communication interface 120 in the first position and second position, e.g. a switching from the first position to the second position may not obstruct the usability of the communication device by a user of the mobile communication device 100.

As an example, the display lid may be movably attached to the chassis 110. The display lid may be movable within a moving range. Here, the wireless communication interface 120 may be arranged outside of the moving range of the display lid. As an example, the wireless communication interface 120 may be arranged lateral, e.g. at a side, to the moving range of the display lid.

Alternatively, or in addition, the keypad may be arranged on one side of the chassis 110, and the wireless communication interface 120 may be arranged on the same side adjacent to the keypad.

Further, the mobile communication device 100 may include a first wireless communication interface 120 and a second wireless communication interface 120 as described before. The first wireless communication interface 120 and the second wireless communication interface 120 may be arranged on different sides of chassis 110. As an example, the first wireless communication interface 120 may be arranged on a slim side of the chassis 110, e.g. located next to one or more interface port(s), and the second wireless communication interface 120 may be arranged on a side including the keypad. The wireless communication interface 120 and the second wireless communication interface 120 may be configured for the same wireless communication protocols, or for different communication protocols. As an example, the wireless communication interface 120 may be a Bluetooth interface and the second wireless communication interface 120 may be a Wi-Fi interface, or vice versa.

The antenna 124 may be configured for communications having frequency larger than 1 GHz. As an example, the antenna 124 may be a Bluetooth interface or a Wi-Fi interface.

The antenna 124 may be configured as a short range mobile radio communication interface such as e.g. a Bluetooth interface, e.g. a Bluetooth Low Energy (LE) interface, Zigbee, Z-Wave, WiFi HaLow/IEEE 802.11ah, and the like. By way of example, one or more of the following Bluetooth interfaces may be provided: Bluetooth V 1.0A/1.0B interface, Bluetooth V 1.1 interface, Bluetooth V 1.2 interface, Bluetooth V 2.0 interface (optionally plus EDR (Enhanced Data Rate), Bluetooth V 2.1 interface (optionally plus EDR (Enhanced Data Rate), Bluetooth V 3.0 interface, Bluetooth V 4.0 interface, Bluetooth V 4.1 interface, Bluetooth V 4.2 interface, Bluetooth V 5.0 interface, Bluetooth V 5.1 interface, Bluetooth V 5.2 interface, Bluetooth V 5.3 interface and the like.

The communication device may further include a communication module mounted to the chassis 110 and coupled to the antenna 124 of the wireless communication interface 120.

The wireless communication interface 120 may further include a controller. The controller may be configured to determine a performance of the wireless communication interface 120 in the first position, and to output an indication signal in case the performance drops below a predetermined threshold value. The chassis 110 may further include a light emitting component, e.g. a light emitting diode, configured to emit a light when receiving the indication signal from the controller. Alternatively, or in addition, the mounting structure 122 may further include a motor configured to position the antenna 124 from the first position into the second position when receiving the indication signal.

The mounting structure 122 may include a stop configured to detachably fix the antenna 124 in the second position. As an example, the mounting structure 122 may be configured to lock-in the antenna 124 in the second position. As an example, the mounting structure 122 may be configured as a push-button or a push-push-button.

As an example, the antenna 124 may include a button component and a radio frequency transceiver component. The button component covers the radio frequency transceiver component. The button component may be movably connected to the mounting structure 122. In other words, the radio frequency transceiver component in the first position and in the second position may include the same effective aperture and impedance. The radio frequency transceiver component may be of a fixed size and/or form factor independent from the position of the first position and the second position. Thus, the radio frequency transceiver component may be operational in each of the first position and the second position, and the radio frequency transceiver component may be operational in the same frequency range in each of the first position and the second position.

The button component and a surface of one or more keys of the keypad of the mobile communication device may be arranged in a common plane (also denoted as co-planar) in the first position.

As an example, the chassis 110 may include an externally accessible interface slot. The mounting structure 122 may be arranged in the interface slot and surface 128 of the button component and the surface 112 of the chassis 110 may form a planar surface in the first position. The radio frequency transceiver component may be arranged or fixed on a surface of the button component, e.g. a surface facing towards the mobile communication device 100.

Alternatively, or in addition, the wireless communication interface 120 may include or be configured as an antenna module. The antenna module may be configured to be mountable in a predefined interface slot of a communication device.

The antenna 124 module may include the antenna 124 and a mounting structure 122. Here, the mounting structure 122 mounts the antenna 124 in the interface slot 126 (as the recess portion of the chassis 110). The mounting structure 122 may be configured to arrange the antenna 124 in a first position and in at least a second position, wherein in the first position the antenna 124 may be arranged in a first distance to a surface 112 of the interface slot 126, and in the second position the antenna 124 may be arranged in a second distance to the surface 112 of the interface slot 126, wherein the second distance may be larger than the first distance.

As an example, in case of a laptop supporting a tablet mode or closed lid mode, the laptop (as communication device) in the tablet mode or closed lid mod may have an antenna performance with the antenna in second position that is about comparable with the antenna performance of the laptop in the laptop mode with the antenna in first position.

Figure 2:
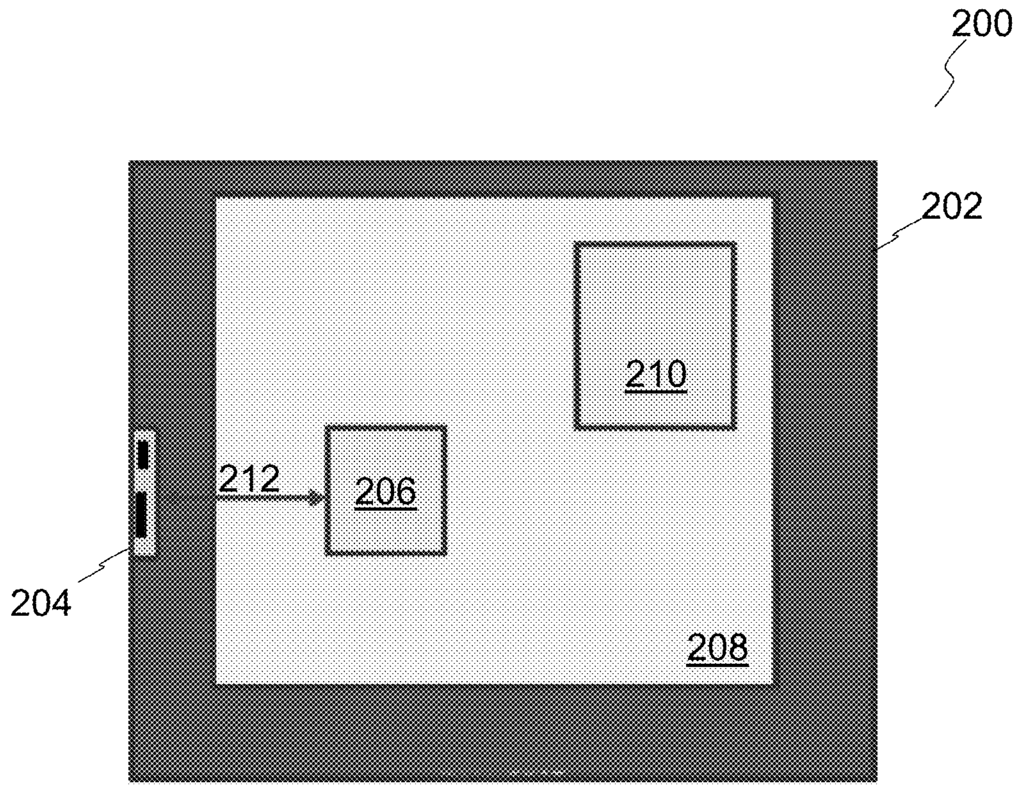
FIG. 2 illustrates a schematic top view on a conventional communication device.

FIG. 2 illustrates a schematic top view of a conventional communication device, e.g. a portion of a conventional laptop. Here, a system on a chip 210 is arranged on a motherboard 208 that is arranged on a chassis 202. A communication module 206 is arranged on the motherboard 208 and coupled to a wireless communication terminal 204 arranged in a distance 212 from the communication module 206 at a side of the communication device 200.

Figure 3A:
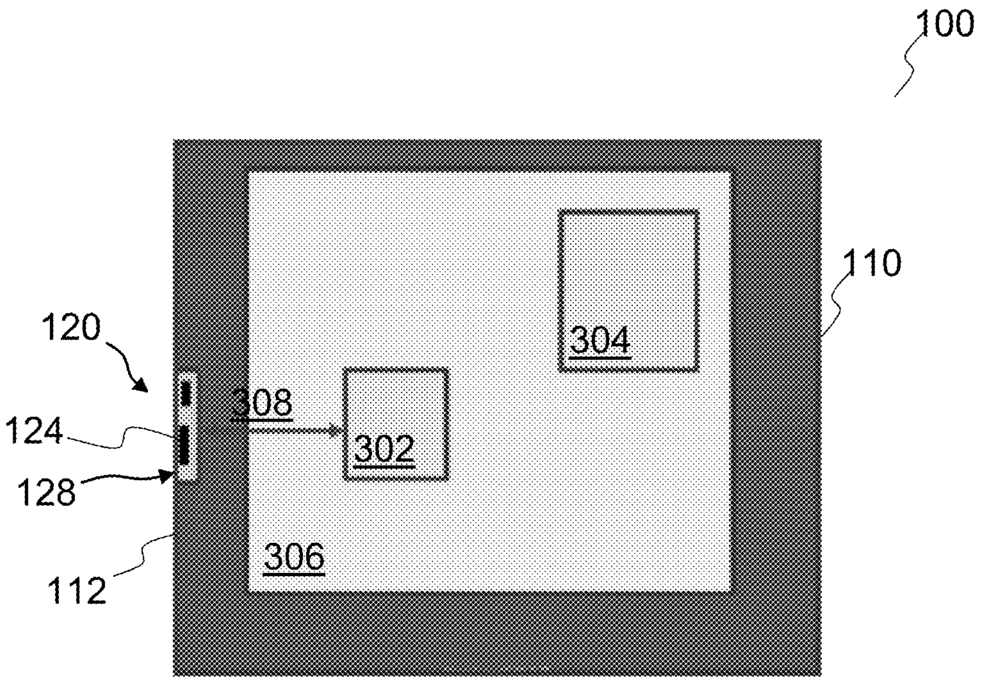
FIG. 3A to FIG. 4B illustrate schematic diagrams of a communication device.
Figure 3B:
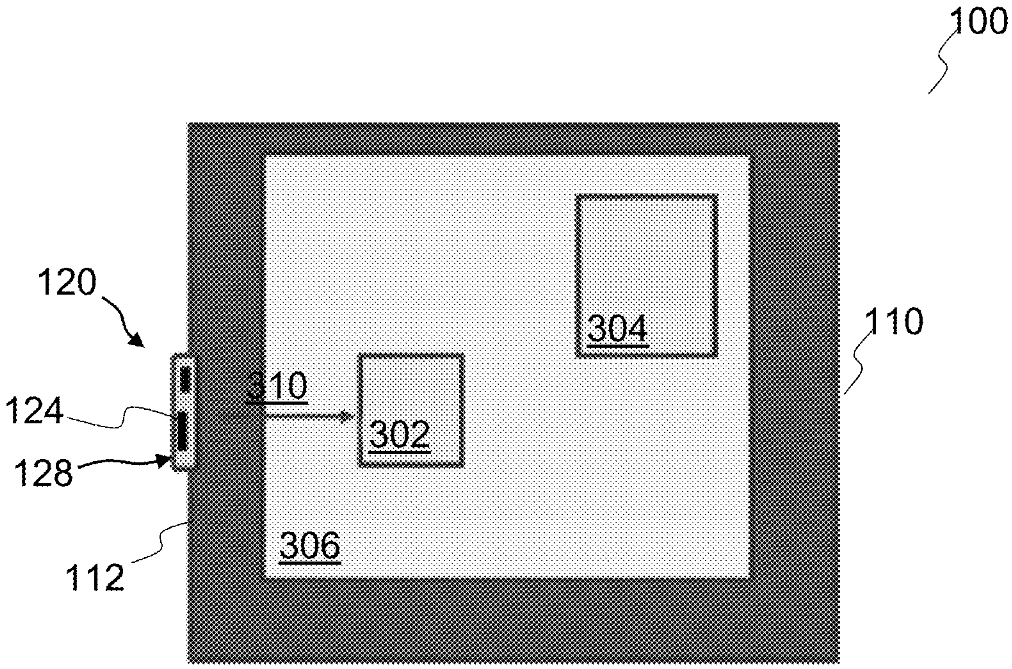

FIG. 3A and FIG. 3B illustrate in schematic top views an example of a communication device 100 having a wireless communication interface 120 that can be placed in the first position (FIG. 3A) and in the second position (FIG. 3B), as described in FIG. 1A and FIG. 1B.

Figure 4A:
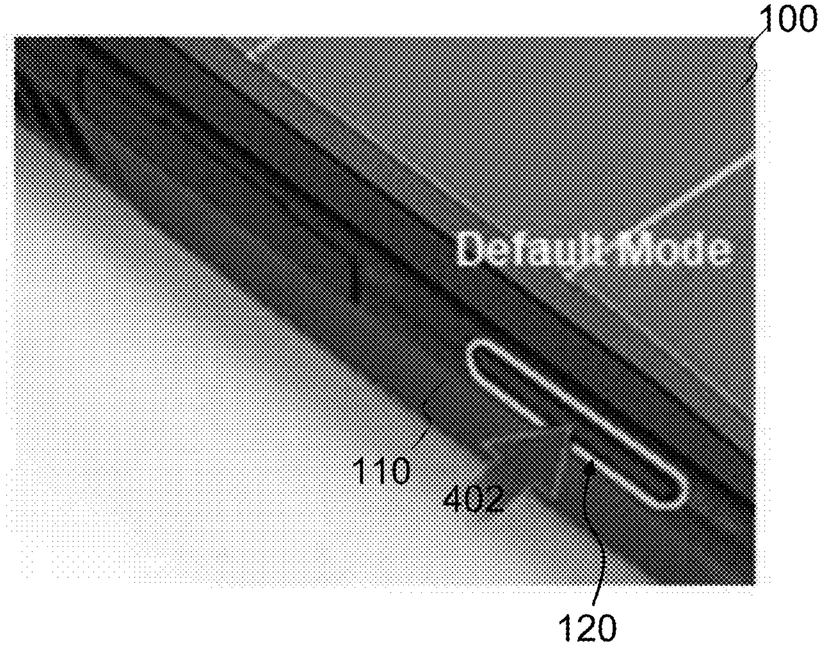

Here, as in the conventional communication device illustrated in FIG. 2, the wireless communication interface 120 is arranged at a side of the chassis 110. In other words, the second position illustrated in FIG. 3B, the antenna 124 protrudes, e.g. extends, sideways from the chassis 110. This way, the antenna 124, in the second position (FIG. 3B), has a second distance 310 larger than a first distance 308 in the first position (FIG. 3A). Thus, in the first position, the antenna 124 may be embedded seamlessly in the chassis 110, as also illustrated in FIG. 4A. In the second position, the antenna 124 sticks out at a side of the chassis 110, as illustrated FIG. 4B.

The communication device 100 may be a mobile phone, e.g., a smartphone, such as an iPhone, Android, Blackberry, etc., a Digital Enhanced Cordless Telecommunications ("DECT") phone, a landline phones, tablets, a media players, e.g., iPod, MP3 player, etc.), a computer, e.g., desktop or laptop, PC, Apple computer, etc.; an audio/video (A/V) wireless communication terminal that can be part of a home entertainment or home theater system, for example, a car audio system or circuitry within the car, remote control, an accessory electronic device, a wireless speaker, or a smart watch, or a Cloud computing device.

As further illustrated, the communication device 100 may include a system on a chip 304 arranged on a motherboard 306 that is arranged on a chassis 110. A communication module 302 may be arranged on the motherboard 306 and coupled to the wireless communication terminal 120.

Figure 4B:
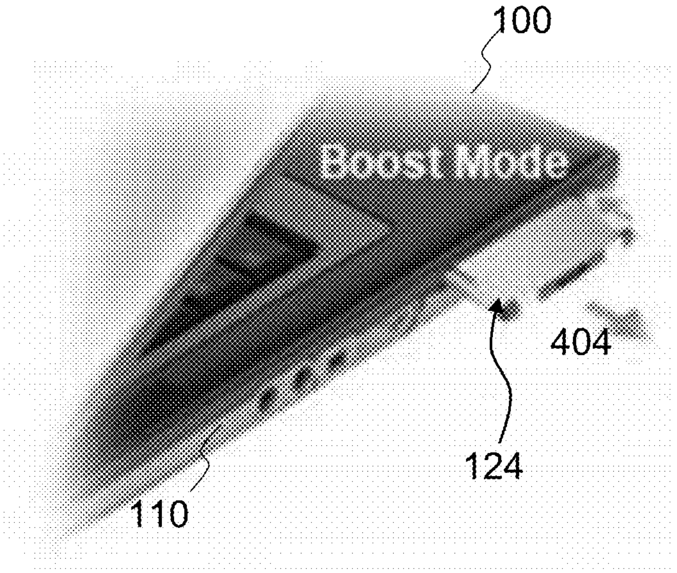

As illustrated in FIG. 4A and FIG. 4B, the wireless communication terminal 120 may be configured as a push-button. As an example, by applying a pressure, e.g. pushing on the wireless communication terminal 120 in the first position (in FIG. 4A illustrated by the arrow 402), the antenna 124 moves from the first position to the second position (in FIG. 4B illustrated by the arrow 404). In the second position, the antenna 124 may have an improved antenna performance (in FIG. 4B denoted as "Boost Mode").

Figure 5A:
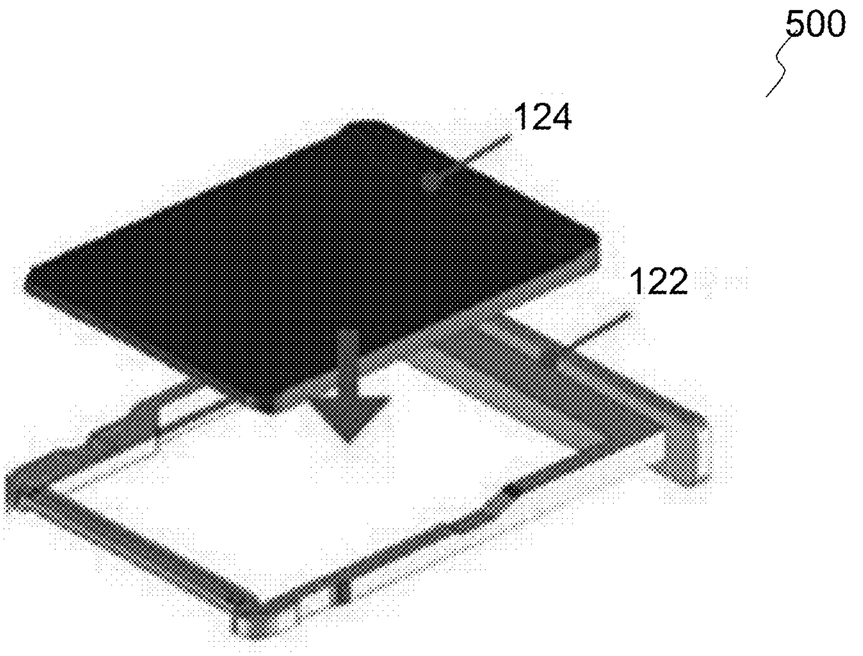
FIG. 5A to FIG. 6B illustrate schematic diagrams of an antenna module.
Figure 5B:
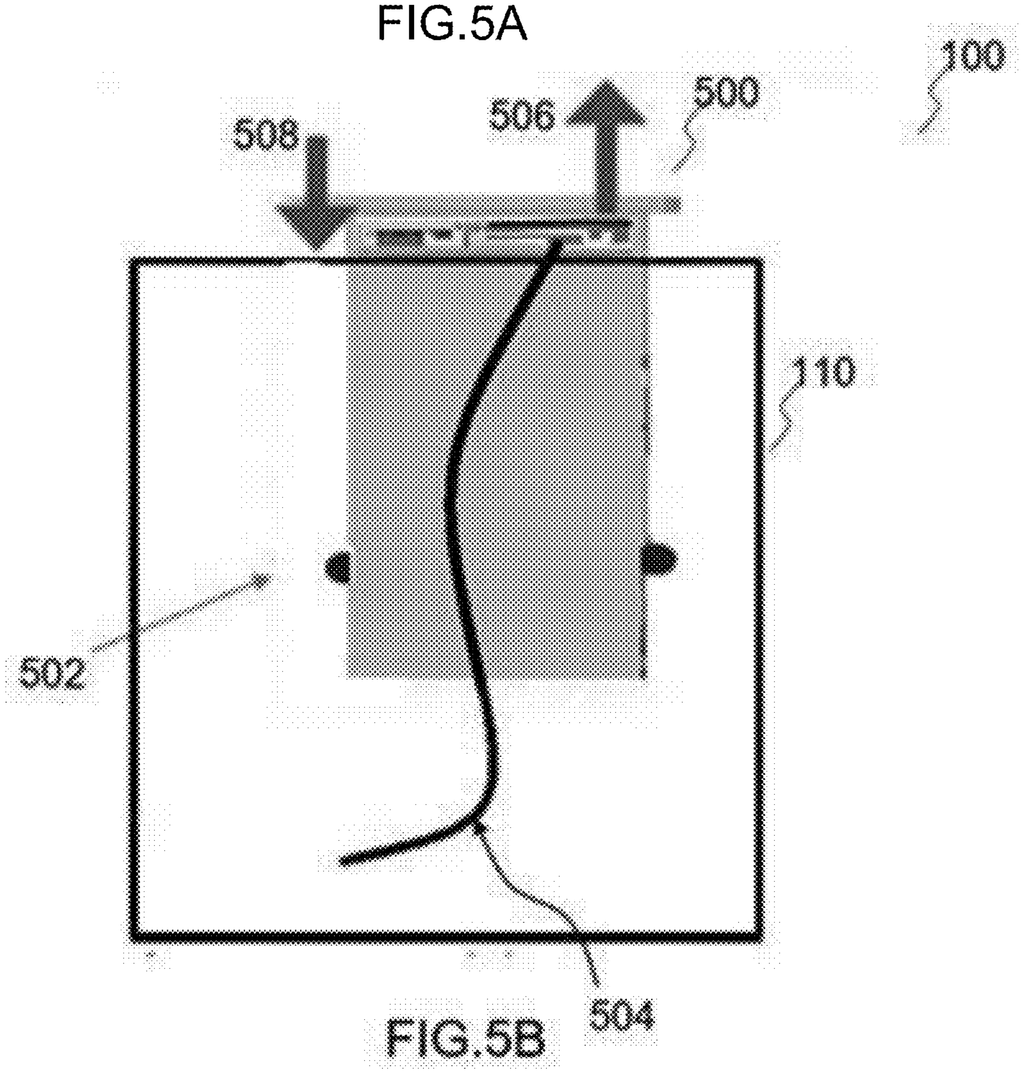

FIG. 5A and FIG. 5B illustrate an example of an antenna module 500 for a mobile communication device 100. The antenna module 500 includes an antenna 124 and a mounting structure 122. The mounting structure 122 may be configured according to a predefined interface slot of the communication device 100. Further, the mounting structure 122 may be configured to receive an antenna 124, and the antenna 124 may be configured accordingly, so that the antenna module 500 fits into the predetermined interface slot. The communication device 100 may include a bus system configured to connect the antenna 124 to the communication module (e.g., see FIG. 3A). Alternatively, the antenna 124 may be coupled to the communication module through a wired connection 504. The mounting structure 122 may include one or more stops 502. The stops 502 may be configured to contain the movement range of the antenna 122 between the first position and the second position. As an example, the antenna may be moved out of the mounting structure (illustrated in FIG. 5B by the arrow 506), and moved back into the mounting structure (illustrated in FIG. 5B by the arrow 508). The stops 502 may prevent that the antenna 124 can be extracted beyond the second position The first position and the second position may determine a movement range of the antenna 124. However, there may be one or more positions between the first position and the second position, wherein the mounting structure may be configured to include a lock-in position in one or more positions within the movement range. Further, the movement range may extend beyond the first position and the second position, as described for the key of the keypad including the antenna 124. The antenna 124 is functional in the same frequency band in each position, e.g. within the movement range. In other words, the mounting structure 122 may be configured that the antenna 124 may be releasable locked-in in the first position and the second position.

Figure 6A:
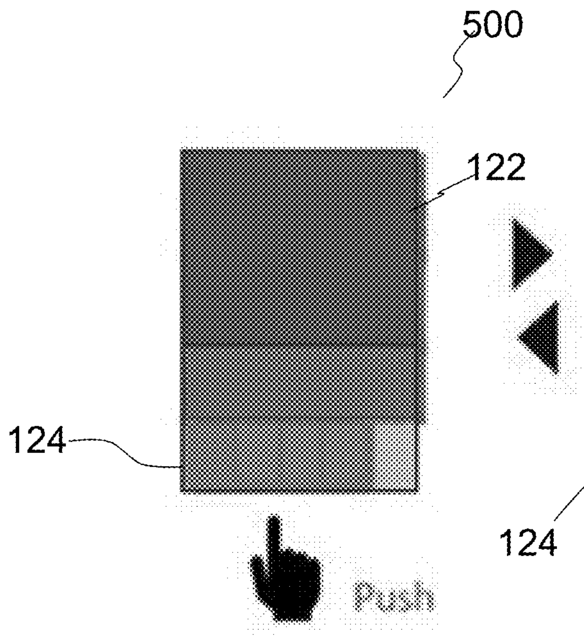
Figure 6B:
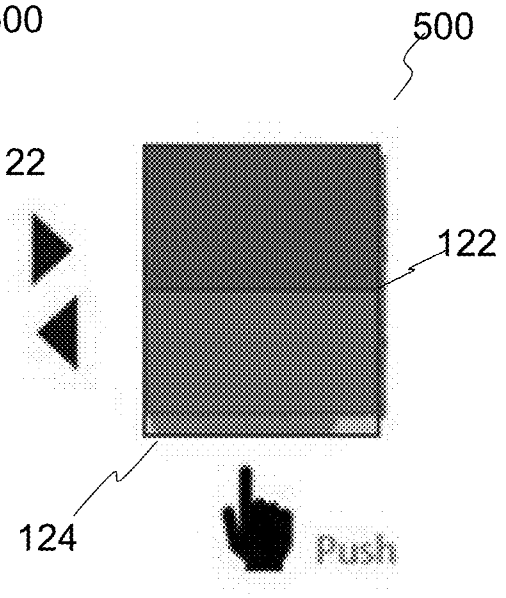

FIG. 6A and FIG. 6B illustrate an example of an antenna module 500 having a push-push mounting structure 122. Here, the mounting structure 122 may be configured that a push at the antenna 124 moves the antenna 124 from the first position into the second position, and vice versa.

Figures 7A, 7B, 7C:
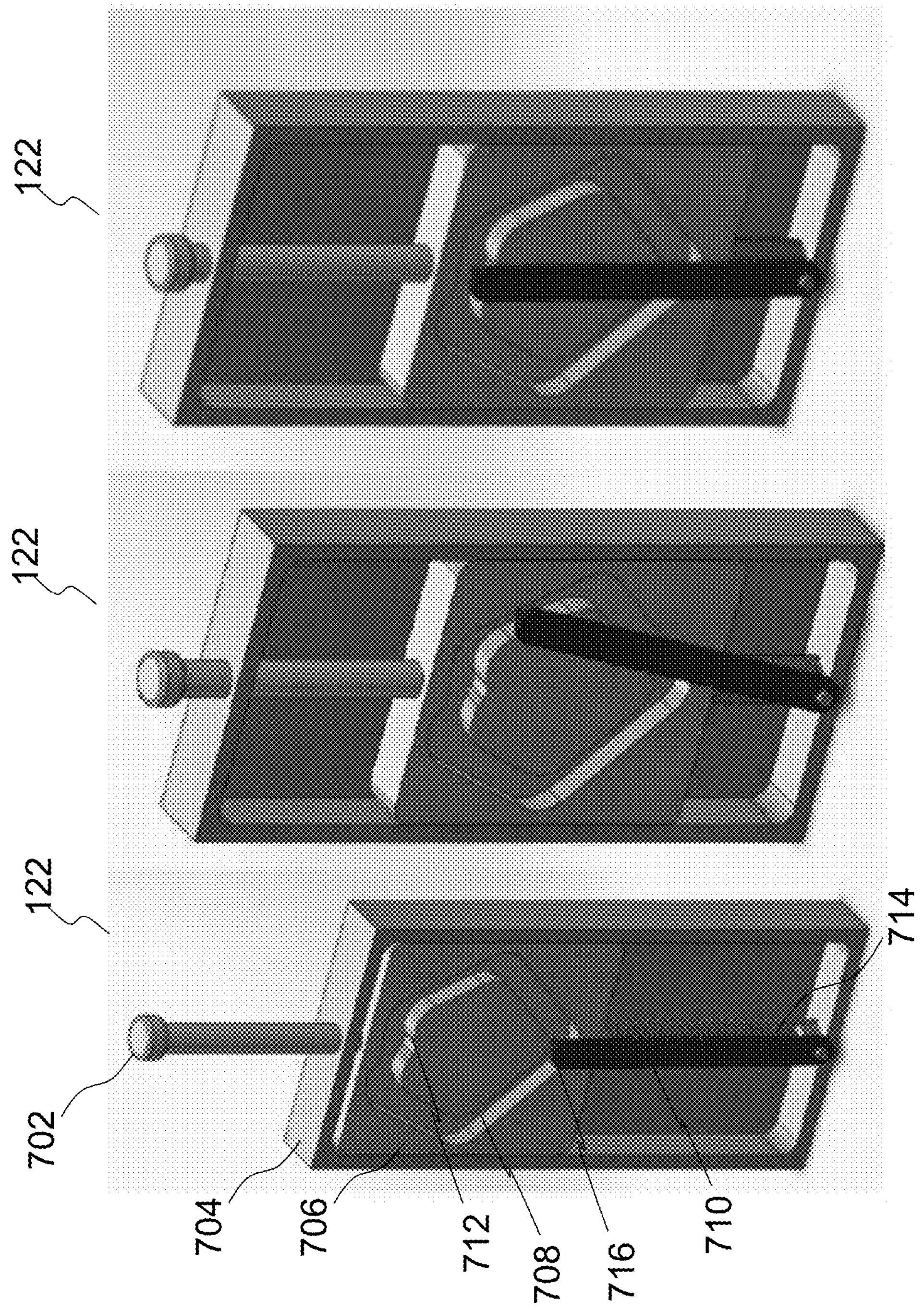
FIG. 7A to FIG. 7C illustrate schematic diagrams of a mounting structure of a wireless communication interface.

FIG. 7A to FIG. 7C illustrate an example of a mounting structure 122 of a push-push configuration. FIG. 7A may illustrate the second position, FIG. 7C may illustrate the first position, and FIG. 7B may illustrate a transition from the first position to the second position, or vice versa. The mounting structure 122 may include a receiving portion 702 configured to receive an antenna. The mounting structure 122 may include a housing portion 704 configured to mount the mounting structure 122 at the chassis of a communication device. Further, the housing portion 704 may house a coupling portion 706 having a track structure 708 including at least a first lock-in portion 712 correlated to the first position, and at least a second lock-in portion 716 correlated to the second position. The mounting structure 122 may further include a spring 714 that keeps the coupling portion 706 in the first position or the second position (in FIG. 7A in the second position). A track running structure 710 may be coupled to the track structure 708 and the housing portion 704. The track running structure 710 may run along the track 708 when moving the antenna between the first position and the second position, and may thus stretch the spring 714. The track running structure 710 may lock-in in at least one of the first lock-in portion 712 and the second lock-in portion 716.

Figure 8:
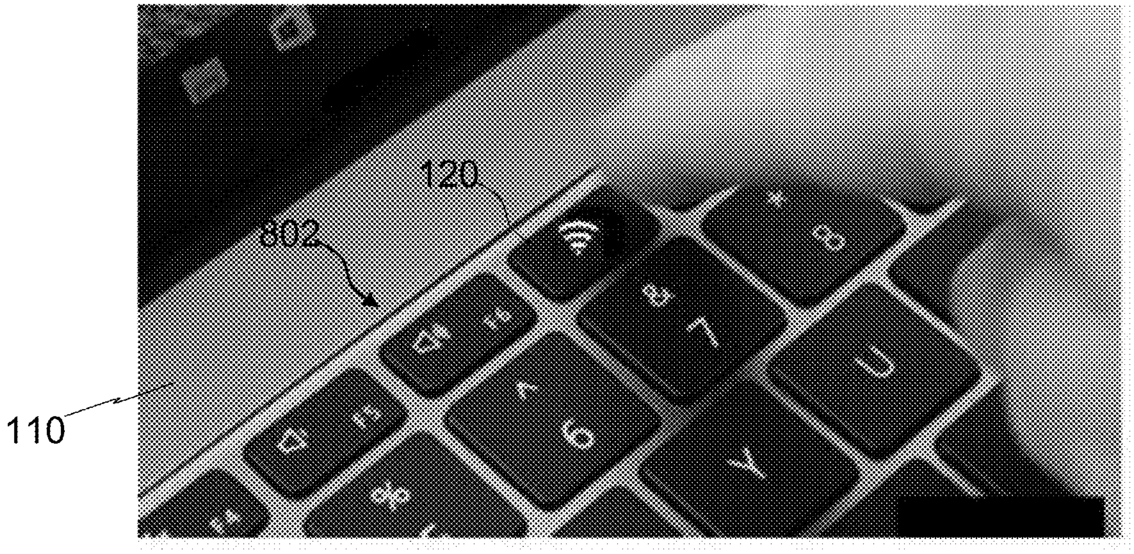
FIG. 8 illustrates a communication device.

FIG. 8 illustrates another example of a communication device having a wireless communication interface 120. Here, the wireless communication interface 120 may be configured as a button on a main side, e.g. an areal side of the communication device 100. The communication device 100 may include a keypad having a plurality of keys 802 on the main side, and the wireless communication interface 120 may be arranged adjacent to the keypad 802 or keys of the keypad 802, or may be integrated among the keys of the keypad 802, or may be embedded in one or more keys of the keypad 802.

Figure 9:
FIG. 9 illustrates a communication device.
Figure 10A:
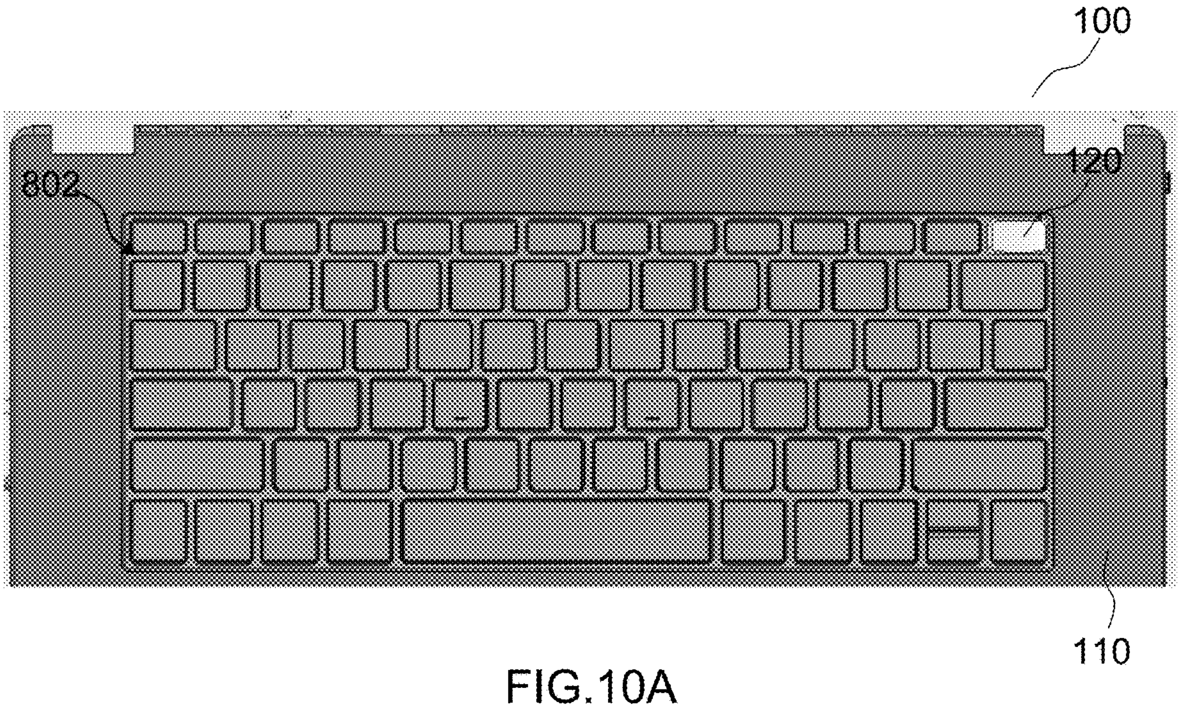
FIG. 10A to FIG. 10B illustrate a communication device.
Figure 10B:
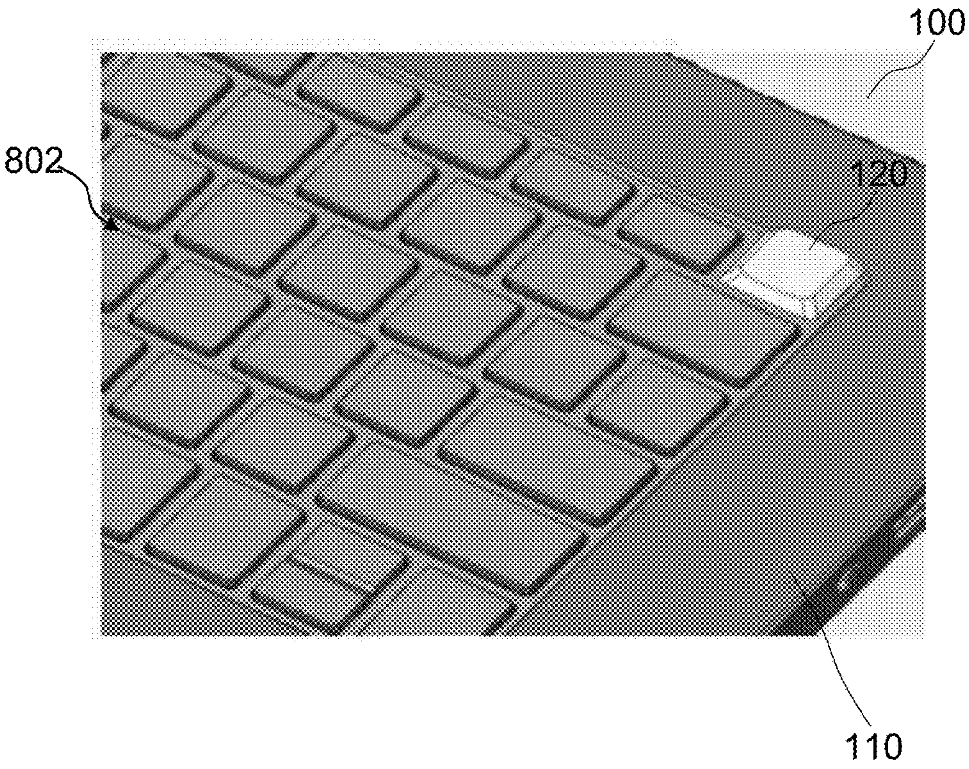

As an example, illustrated in FIG. 9, the keypad 802 may include a predefined cutout portion 902 (also denoted as pocket 902) that is designated for the wireless communication interface 120, as illustrated in FIG. 10A (also denoted as default mode or first position) and FIG. 10B (also denoted as boost mode, pop out mode or second position). The wireless communication interface 120 may include a button component, e.g. a custom key, that in the first position, is about coplanar to one or more keys of the keypad, and extends beyond the one or more keys in the second position. The button component (also denoted as key) may have an appearance and functionality of an original key similar to the keys of the keypad 802. A radio frequency transceiver component may be attached at an underside of the button component, and hence may not be visible from the outside. The button component and the radio frequency transceiver component may form the antenna of the wireless communication interface 120. The button component may be attached (also denoted as mounted) to the mounting structure of the wireless communication interface 120, as described above.

Figure 11A:
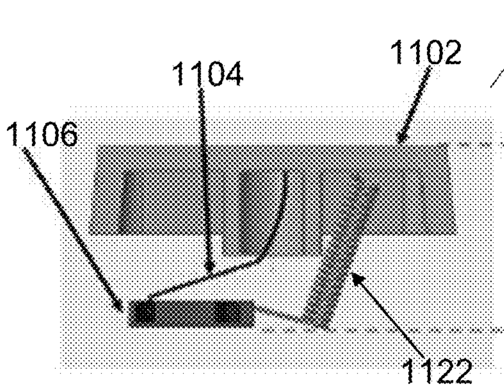
FIG. 11A to FIG. 11D illustrate a communication device.
Figure 11B:
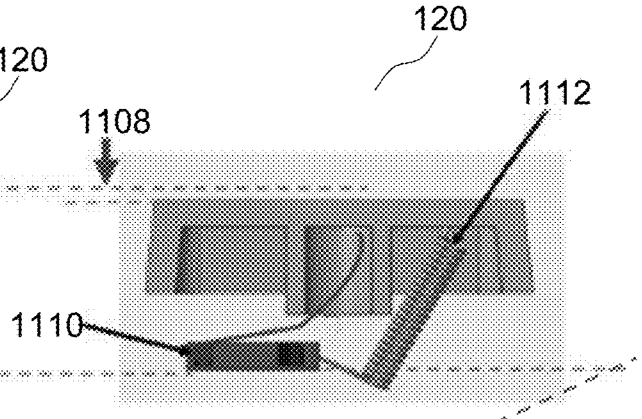
Figure 11C:
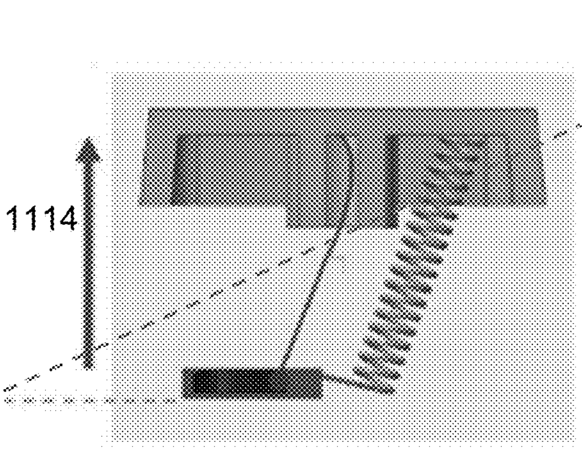
Figure 11D:
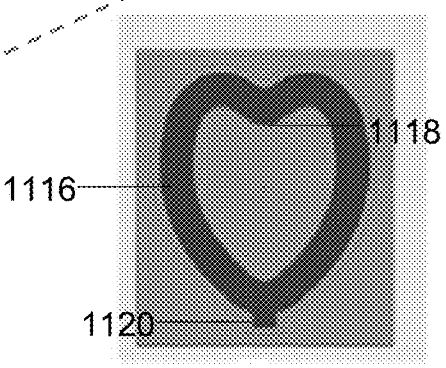

A cross-sectional view of an example of such a wireless communication interface 120 is illustrated in FIG. 11A to FIG. 11D. The wireless communication interface 120 may be configured as push-push-button, e.g. formed in the shape of a key of a keypad having a plurality of keys. FIG. 11A illustrates a wireless communication interface 120 in a first position. A cam 1106 provides a mechanical connection 1104 to a radio frequency transceiver component arranged at an underside of the button component 1102. Here, the radio frequency transceiver component and the button component 1102 may form the antenna of the wireless communication interface 120. The cam 1106, the mechanical connection 1104, and the spring 1122 may be part of the mounting structure of the wireless communication interface 120. FIG. 11A may illustrate a default position of the antenna, e.g. the antenna in the first position. FIG. 11B illustrates a push on the button component 1102 of the antenna that causes a push-in 1108 (also denoted as offset or travel) of the button component 1102. The button component 1102 moves (in FIG. 11C illustrated by arrow 1114) into the boost position (also denoted as the second position) on a long press and/or pressing with a larger pressure, and when releasing pressure from the button component 1102. The antenna in the second position that is elevated above the default position can have an improved antenna performance. FIG. 11D may illustrate a cam path 1116 (also denoted as track) having a first lock-in position 1120 and a second lock-in position 1118 (e.g. corresponding to the working principle illustrated in FIG. 7A to FIG. 7C).

Figure 12A:
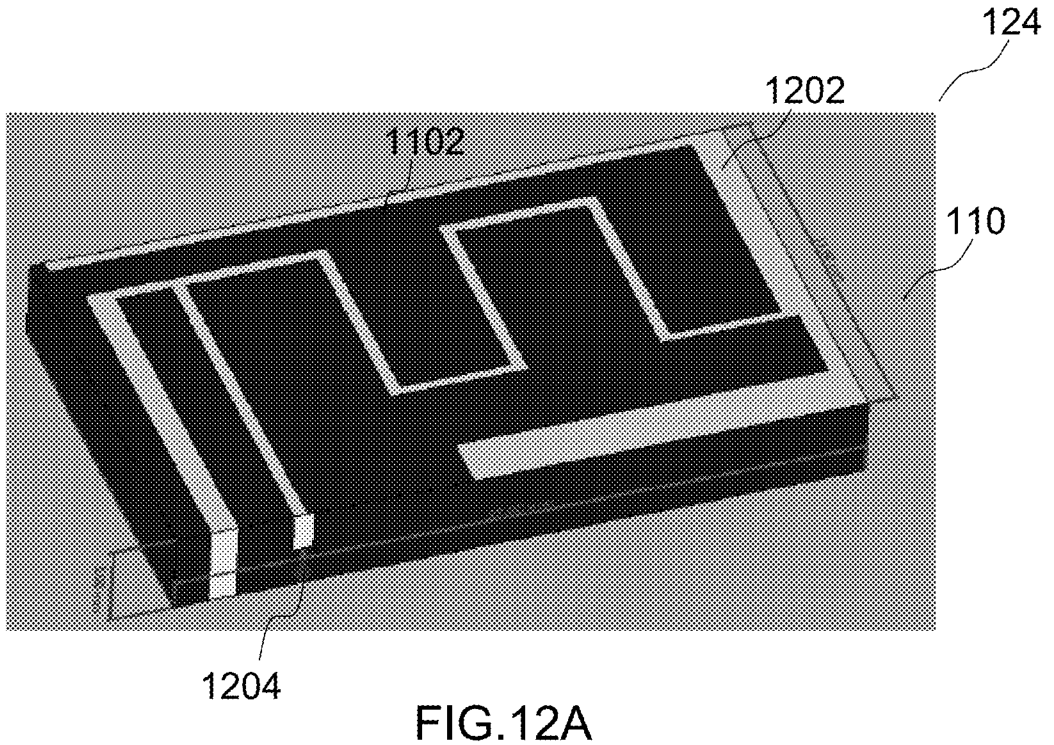
FIG. 12A to FIG. 12B illustrate a communication device.
Figure 12B:
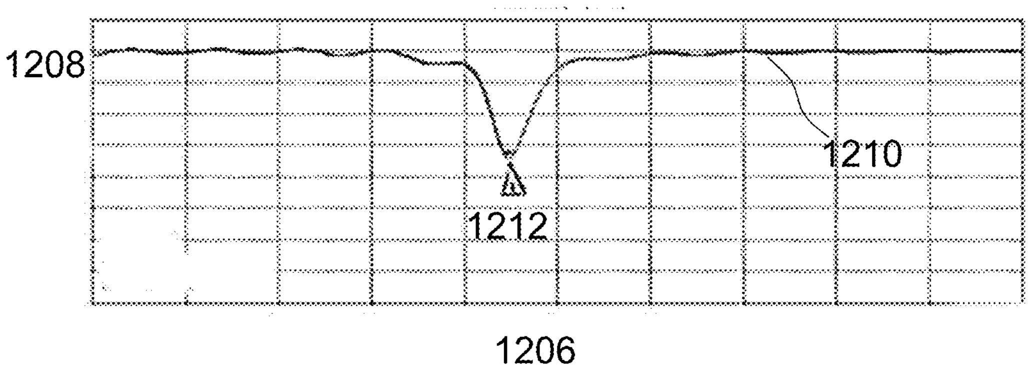
Figure 13A:
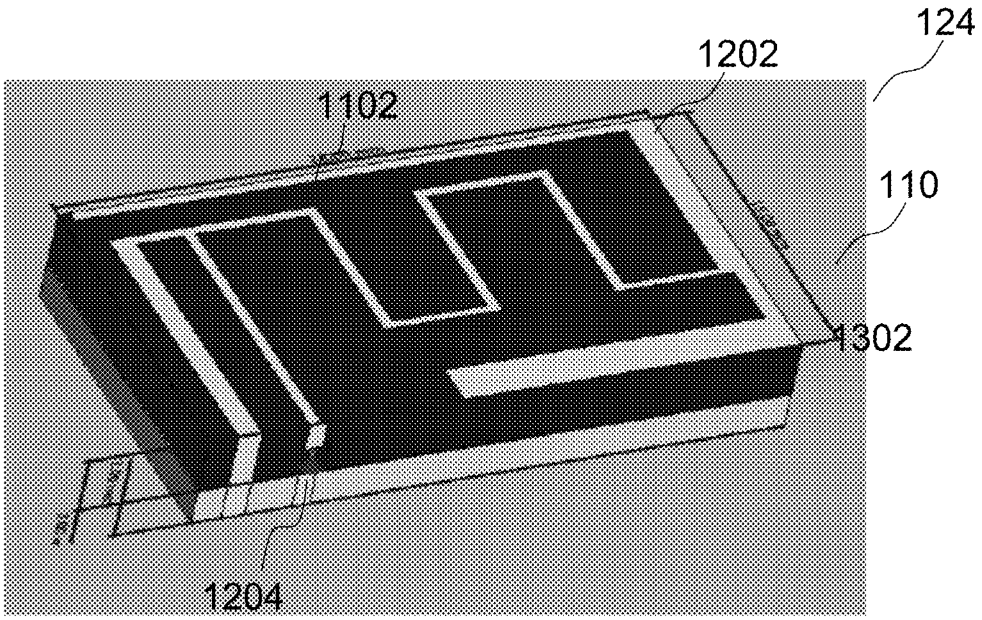
FIG. 13A to FIG. 13B illustrate a communication device.
Figure 13B:
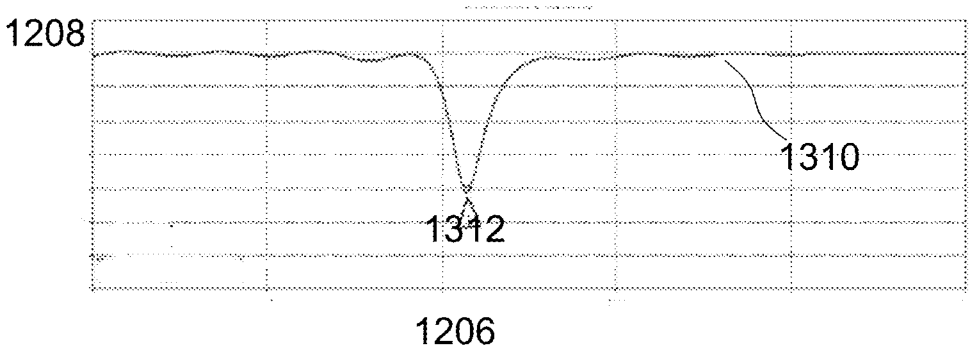

FIG. 12A and FIG. 12B illustrate an antenna and its performance in the first position, and FIG. 13A and FIG. 13B illustrate the antenna and its performance of the antenna in the second position. FIG. 12A illustrates the frequency transceiver component 1202, e.g. a metallic antenna pattern, on a button component 1102 (also denoted as key) including the position of an antenna feeding 1204. As an example, the key 1102 may have a dimension of about 25 mm×15 mm×3 mm for a laptop as communication device. In the second position, illustrated in FIG. 13A, the key 1102 is elevated by about 2 mm. FIG. 12B and FIG. 13B illustrate the antenna return loss 1208 in decibel (dB) as a function of frequency 1206 in Hertz (Hz) for the antenna in the first position 1210 and in the second position 1310. As illustrated, the antenna return loss in the first position may be a maximum loss 1212 of −3 dB, and in the second position may be a maximum loss 1312 of −8 dB. Thus, the antenna 124 in the second position may increase the wireless communication range, e.g. for a Bluetooth communication link.

Figure 14:
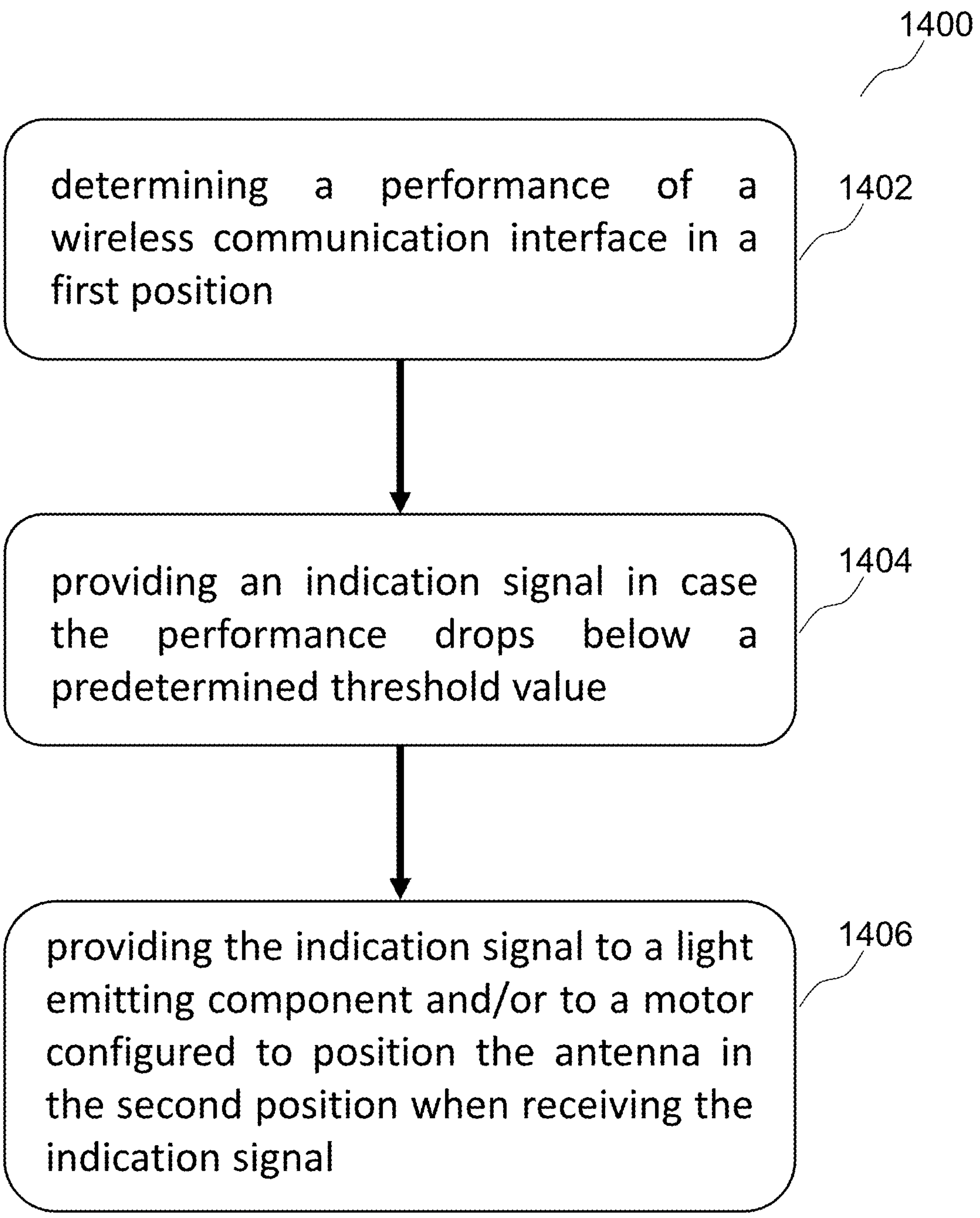
FIG. 14 illustrates a flow chart of a method to operate the communication device.

FIG. 14 illustrates a flow chart of a method 1400 to operate a communication device. The method 1400 may include determining 1402 a performance of a wireless communication interface in a first position, and providing 1404 an indication signal in case the performance drops below a predetermined threshold value. The indication signal may be provided 1406 to a light emitting component configured to emit a light when receiving the indication signal and/or operating system (OS) notification and/or to a motor configured to position the antenna in the second position when receiving the indication signal.

EXAMPLES

The examples set forth herein are illustrative and not exhaustive.

Example 1 is a communication device including a chassis; and a wireless communication interface having an antenna and a mounting structure, the mounting structure mounting the antenna to the chassis, wherein the mounting structure is configured to arrange the antenna in a first position and in at least a second position, wherein in the first position the antenna is arranged in a first distance to a surface of the chassis, and in the second position the antenna is arranged in a second distance to the surface of the chassis, wherein the second distance is larger than the first distance. The antenna is operational in the same frequency range in each of the first position and the second position In Example 2, the subject matter of Example 1 can optionally include that the antenna in the first position and in the second position includes the same effective aperture and impedance.

In Example 3, the subject matter of any one of Examples 1 or 2 can optionally include that the chassis includes or is formed of a metal.

In Example 4, the subject matter of any one of Examples 1 to 3 can optionally include that the second distance is larger than the first distance in a range from about 0.5 mm to 5 mm, in particular 2 mm.

In Example 5, the subject matter of any one of Examples 1 to 4 can optionally include a hinge and a display lid, wherein the display lid and the chassis are coupled to the hinge, wherein the wireless communication interface is arranged in the proximity of the hinge.

In Example 6, the subject matter of any one of Examples 1 to 5 can optionally include a display lid coupled to the chassis, wherein the display lid is movably attached to the chassis, wherein the display lid is movable within a moving range and wherein the wireless communication interface is arranged outside of the moving range of the display lid.

In Example 7, the subject matter of any one of Examples 1 to 6 can optionally include a keypad having a plurality of keys arranged on one side of the chassis, wherein the wireless communication interface is arranged the same side adjacent to the keypad or keys of the keypad, or may be integrated among the keys of the keypad, or may be embedded in one or more keys of the keypad.

In Example 8, the subject matter of any one of Examples 1 to 7 can optionally include a controller configured to determine a performance of the wireless communication interface in the first position, and to output an indication signal in case the performance drops below a predetermined threshold value.

In Example 9, the subject matter of Example 8 can optionally include that the chassis further includes a light emitting component configured to emit a light when receiving the indication signal.

In Example 10, the subject matter of Examples 8 or 9 can optionally include that the mounting structure further includes a motor configured to position the antenna in the second position when receiving the indication signal.

In Example 11, the subject matter of any one of Examples 1 to 10 can optionally include that the mounting structure includes a stop configured to detachably fix the antenna in the second position.

In Example 12, the subject matter of any one of Examples 1 to 11 can optionally include that the mounting structure is fixed to the chassis.

In Example 13, the subject matter of any one of Examples 1 to 12 can optionally include that the mounting structure is configured as a push-button or a push-push-button.

In Example 14, the subject matter of any one of Examples 1 to 13 can optionally include that the antenna includes a button component and a radio frequency transceiver component, wherein the button component covers the radio frequency transceiver component, and wherein the button component is movably connected to the mounting structure.

In Example 15, the subject matter of Example 14 can optionally include a keypad having a plurality of keys, wherein the button component and a surface of one or more keys of the keypad are arranged in a common plane in the first position.

In Example 16, the subject matter of any one of Examples 1 to 15 can optionally include that the communication device is a laptop computer.

In Example 17, the subject matter of any one of Examples 1 to 16 can optionally include that the antenna is a Bluetooth interface or a WiFi interface.

Example 18 is an antenna module configured to be mountable in a predefined interface slot of a communication device, the antenna module including an antenna and a mounting structure, the mounting structure mounting the antenna in the predefined interface slot, wherein the mounting structure is configured to arrange the antenna in a first position and in at least a second position, wherein in the first position the antenna is arranged in a first distance to a surface of the interface slot, and in the second position the antenna is arranged in a second distance to the surface of the interface slot, wherein the second distance is larger than the first distance. The antenna is operational in the same frequency range in each of the first position and the second position In Example 19, the subject matter of any one of Example 18 can optionally include that the antenna includes a button component and a radio frequency transceiver component, wherein the button component covers the radio frequency transceiver component, and wherein the button component is movably connected to the mounting structure.

In Example 20, the subject matter of Example 19 can optionally include that the radio frequency transceiver component is operational in the same frequency range in each of the first position and the second position.

In Example 21, the subject matter of Example 19 or 20 can optionally include that the mounting structure is fixable in the interface slot, such that the button component and a surface of the interface slot form a planar surface in the first position.

Example 22 is a non-transitory computer readable medium including instructions which, if executed by one or more processors, cause the one or more processors to: determine a performance of the wireless communication interface in a first position, and output an indication signal in case the performance drops below a predetermined threshold value; and provide the indication signal to a motor configured to position the antenna in the second position when receiving the indication signal.

In Example 23, the subject matter of Example 22 can optionally include instructions to provide the indication signal to a light emitting component configured to emit a light when receiving the indication signal.

Example 24 is a communication means having a wireless communication interface having a transceiver means and a mounting means, the mounting means for mounting the transceiver means to a housing means, the mounting means for arranging the transceiver means in a first position and in at least a second position, wherein in the first position the transceiver means is arranged in a first distance to a surface of the housing means, and in the second position the transceiver means is arranged in a second distance to the surface of the housing means, wherein the second distance is larger than the first distance. The transceiver means is operational in the same frequency range in each of the first position and the second position.

In Example 25, the subject matter of Example 24 can optionally include that the transceiver means in the first position and in the second position includes the same effective aperture and impedance.

In Example 26, the subject matter of any one of Examples 24 or 25 can optionally include that the housing means includes or is formed of a metal.

In Example 27, the subject matter of any one of Examples 24 to 26 can optionally include that the second distance is larger than the first distance in a range from about 0.5 mm to 5 mm, in particular 2 mm.

In Example 28, the subject matter of any one of Examples 24 to 27 can optionally include a display means coupled to the housing means, wherein the display means and the housing means are coupled to a rotation means, wherein the wireless communication interface is arranged in the proximity of the rotation means.

In Example 29, the subject matter of any one of Examples 24 to 28 can optionally include a display means coupled to the housing means, wherein the display means is movably attached to the housing means, wherein the display means is movable within a moving range and wherein the wireless communication interface is arranged outside of the moving range of the display means.

In Example 30, the subject matter of any one of Examples 24 to 29 can optionally include a key input means arranged on one side of the housing means, wherein the wireless communication interface is arranged the same side adjacent to the key input means.

In Example 31, the subject matter of any one of Examples 24 to 30 can optionally include a controlling means for determining a performance of the wireless communication interface in the first position, and for providing an indication signal in case the performance drops below a predetermined threshold value.

In Example 32, the subject matter of Example 31 can optionally include that the housing means further includes a light emitting means configured to emit a light when receiving the indication signal.

In Example 33, the subject matter of Examples 31 or 32 can optionally include that the mounting means further includes a motion means for positioning the transceiver means in the second position when receiving the indication signal.

In Example 34, the subject matter of any one of Examples 24 to 33 can optionally include that the mounting means includes a stopping means for detachably fixing the transceiver means in the second position.

In Example 35, the subject matter of any one of Examples 24 to 34 can optionally include that the mounting means is fixed to the housing means.

In Example 36, the subject matter of any one of Examples 24 to 35 can optionally include that the mounting means is configured as a push-button or a push-push-button.

In Example 37, the subject matter of any one of Examples 24 to 36 can optionally include that the transceiver means includes a button component and a radio frequency transceiver component, wherein the button component covers the radio frequency transceiver component, and wherein the button component is movably connected to the mounting means.

In Example 38, the subject matter of any one of Examples 24 to 37 can optionally include a key input means, wherein the button component and a surface of one or more keys of the key input means are arranged in a common plane in the first position.

In Example 39, the subject matter of any one of Examples 24 to 38 can optionally include that the mobile communication means is a laptop computer.

In Example 40, the subject matter of any one of Examples 24 to 39 can optionally include that the transceiver means is a Bluetooth interface or a WiFi interface.

Example 41 is a method to operate a communication device, the method including determining a performance of a wireless communication interface in a first position, and output an indication signal in case the performance drops below a predetermined threshold value, and providing of the indication signal to a motor configured to position the antenna in the second position when receiving the indication signal.

In Example 42, the subject matter of Example 40 can optionally include a providing of the indication signal to a light emitting component configured to emit a light when receiving the indication signal.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more components from a single component, mounting two or more components onto a common chassis to form an integrated component, executing discrete software components on a common processor core, etc. Conversely, skilled persons will recognize the possibility to separate a single element into two or more discrete elements, such as splitting a single component into two or more separate component, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communication device comprising:

a chassis; and a wireless communication interface having an antenna and a mounting structure, the mounting structure mounting the antenna to the chassis, wherein the mounting structure is configured to arrange the antenna in a first position, inside the chassis, and in at least a second position, outside of the chassis, wherein in the first position the antenna is arranged in a first distance to a surface of the chassis, and in the second position the antenna is arranged in a second at least partially ejected distance to the surface of the chassis, wherein the second distance is vertically elevated from the first distance;

wherein the antenna is operational in a frequency in the first position and is operational in the frequency in the second position; and wherein the mounting structure comprises a coupling portion having track structure comprising a first lock-in portion correlated to the first position and a second lock-in portion corelated to the second position.

2. The communication device of claim 1, wherein the chassis comprises or is formed of a metal.

3. The communication device of claim 1, further comprising a hinge and a display lid coupled to the chassis, wherein the display lid and the chassis are coupled to a hinge, wherein the wireless communication interface is arranged in the proximity of the hinge.

4. The communication device of claim 1, further comprising a display lid coupled to the chassis, wherein the display lid is movably attached to the chassis, wherein the display lid is movable within a moving range and wherein the wireless communication interface is arranged outside of the moving range of the display lid.

5. The communication device of claim 1, further comprising a keypad having a plurality of keys arranged on one side of the chassis, wherein the wireless communication interface is arranged on the same side adjacent to the keypad.

6. The communication device of claim 1, further comprising a controller configured to determine a performance of the wireless communication interface in the first position, and to output an indication signal in case the performance drops below a predetermined threshold value.

7. The communication device of claim 6, the chassis further comprising a light emitting component configured to emit a light when receiving the indication signal.

8. The communication device of claim 6, the mounting structure further comprising a motor configured to position the antenna in the second position when receiving the indication signal.

9. The communication device of claim 1, wherein the mounting structure is fixed to the chassis.

10. The communication device of claim 1, wherein the antenna comprises a button component and a radio frequency transceiver component, wherein the button component covers the radio frequency transceiver component, and wherein the button component is movably connected to the mounting structure.

11. The communication device of claim 10, further comprising a keypad having a plurality of keys, wherein the button component and a surface of one or more keys of the keypad are arranged in a common plane in the first position.

12. The communication device of claim 10, further comprising a keypad having a plurality of keys, wherein the button component is arranged according to at least one of: adjacent to one or more keys of the keypad, integrated in the keypad among the keys of the keypad, or embedded in one or more keys of the keypad.

13. An antenna module being mountable in a predefined interface slot of a communication device, the antenna module comprising:

an antenna and a mounting structure, the mounting structure mounting the antenna in the predefined interface slot, wherein the mounting structure is configured to arrange the antenna in a first position, inside a chassis of a communication device, and in at least a second position, outside the chassis of the communication device, wherein in the first position the antenna is arranged in a first distance to a surface of the interface slot, and in the second position the antenna is arranged in a second at least partially ejected distance to the surface of the interface slot, wherein the second distance is elevated from the first distance;

wherein the antenna is operational in a frequency in the first position and is operational in the frequency in the second position; and wherein the mounting structure comprises a coupling portion having track structure comprising a first lock-in portion correlated to the first position and a second lock-in portion corelated to the second position.

14. The antenna module of claim 13, the antenna comprising a button component and a radio frequency transceiver component, wherein the button component covers the radio frequency transceiver component, and wherein the button component is movably connected to the mounting structure.

15. The antenna module of claim 14, wherein the radio frequency transceiver component is a Bluetooth interface or a WiFi interface.

16. The antenna module of claim 14, wherein the antenna mounting structure further comprises a spring configured to keep the coupling portion in at least one of the first position and the second position.

17. The antenna module of claim 13, wherein the radio frequency transceiver component is operational in the same frequency range in each of the first position and the second position.

18. The antenna module of claim 13, wherein the mounting structure is fixable in the interface slot such that a button component and a surface of the interface slot form a planar surface in the first position.

19. The antenna module of claim 13, wherein the mounting structure is configured to include a lock-in position in one or more positions in the movement range between the first position and the second position.

* * * * *